UNITED STATES PATENT OFFICE.

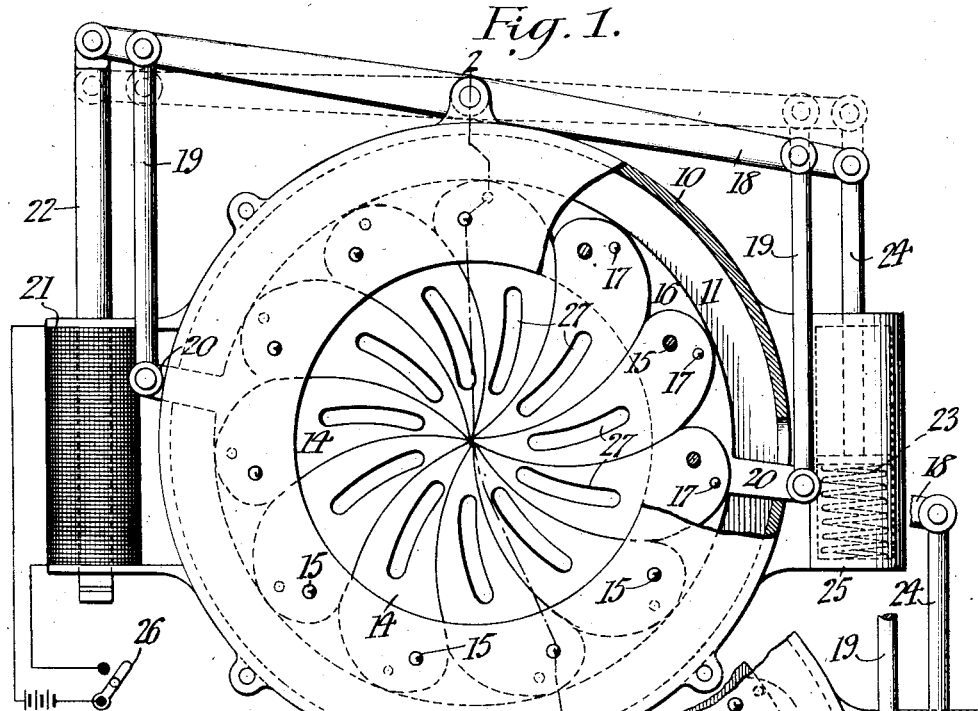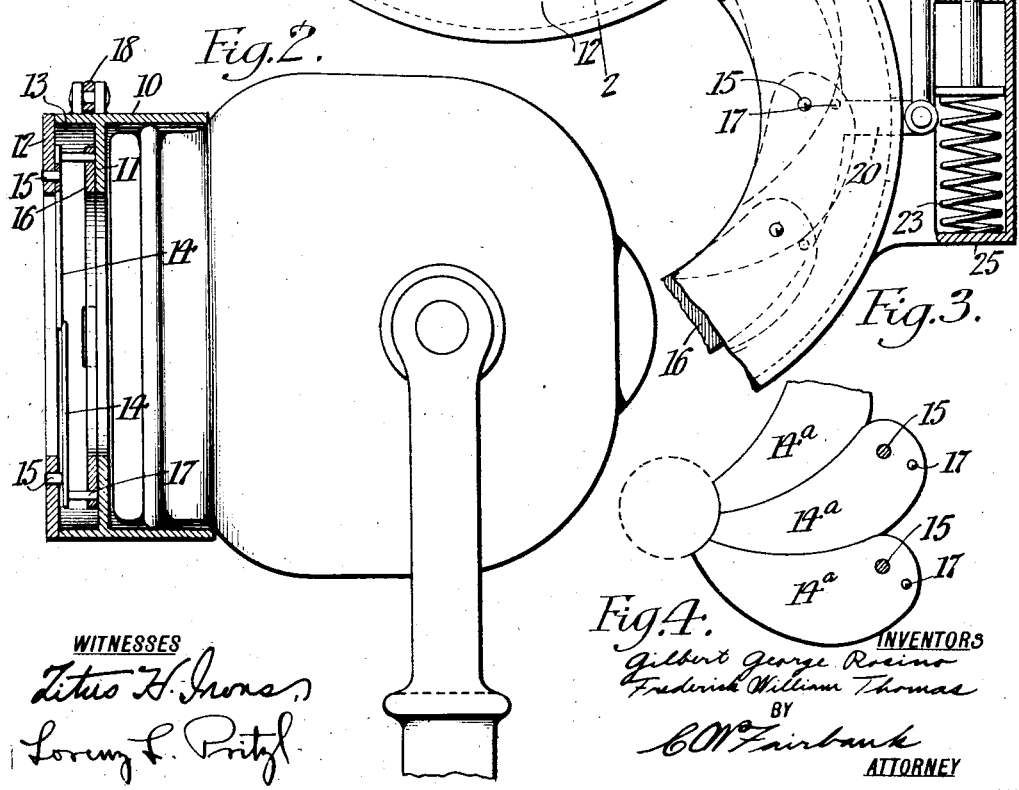

GILBERT G. ROSINO AND FREDERICK W. THOMAS, OF SANDUSKY, OHIO.

HEADLIGHT-DIMMER.

1,084,113.  Specification of Letters Patent.  Patented Jan. 13, 1914.

Application filed October 28, 1912. Serial No. 728,072.

*To all whom it may concern:*

Be it known that we, GILBERT GEORGE ROSINO and FREDERICK WILLIAM THOMAS, both citizens of the United States, and residents of Sandusky, in the county of Erie and State of Ohio, have invented a new and Improved Headlight-Dimmer, of which the following is a full, clear, and exact description.

On automobiles, street cars, locomotives, and other vehicles, it is common practice to provide headlights for illuminating the pathway or track, but such headlights, particularly if of high power, often act to temporarily blind or confuse persons or animals approaching the vehicle, and this often results in accidents. To prevent such accidents many municipalities and villages prohibit the use of high-power headlights within the city or village limits.

Our invention is shown as embodied in a device particularly adapted for use in dimming or cutting off the light rays from the headlight whenever desired and substantially instantaneously. Thus, the driver, engineer, or chauffeur of the vehicle may reduce the illuminating power of the headlight as he approaches a person or animal that might be confused or frightened by the extremely bright light. Preferably, the light rays are not entirely cut off, thus leaving a limited illumination of the pathway or track when the device is in operation. This is particularly desirable when the light is to be dimmed for some little time, as in passing through a lighted city street, congested district, or locality where high-power lights on vehicles are unnecessary or prohibited.

In the preferred embodiment of our invention there are provided a plurality of plates so mounted that they may be swung toward the center of the lamp to accomplish the desired results. The operating mechanism for the plates is such that the dimmer may be brought into operation by a chauffeur, engineer, or other person on the vehicle, without leaving his seat and upon instant notice. Preferably, an electromagnet is employed which will operate upon the closing of the circuit, to draw the plates into closed or operative position and retain them there until the circuit is broken, although it is, of course, evident that other operating means might be employed within the scope of the appended claims.

Preferably, the device is so constructed as to facilitate its attachment to a headlight already in use, although the invention may be employed by constructing a device within the headlight or other lamp as a part thereof. In such case, it might be arranged inside of the casing between the source of light and the lens or glass front, or it might be arranged in the rear of the source of light and between the latter and the reflector, so that the direct light rays may escape but those concentrated and reflected from the back will be cut off.

Reference is to be had to the accompanying drawings, forming a part of this specification, in which similar characters of reference indicate corresponding parts in all the views, and in which—

Figure 1 is a front view of a headlight dimmer constructed in accordance with our invention, a portion thereof being shown in section and the blades or plates being shown in closed position: Fig. 2 is a side elevation of a headlight having our improved dimmer applied thereto and shown in section substantially on the line 2—2 of Fig. 1; Fig. 3 is a view similar to a portion of Fig. 1 but showing the plates in open position, and Fig. 4 is a detail showing a slightly modified form of plate which leaves a small central unobstructed opening rather than openings through the plates.

Our invention is illustrated in a form in which there is employed a substantially cylindrical casing 10, open at the rear end and having two inwardly-projecting flanges 11 and 12, one of which may be formed integral with the peripheral wall and the other of which may be in the form of a front annular plate bolted or otherwise attached to the casing. The flange 11 is illustrated as being spaced some distance forwardly of the rear end of the casing and a short distance from the front flange 12, so as to leave an annular recess or chamber 13. The space in the rear of the flange 11 may serve to receive the front projecting end of the searchlight, as illustrated in Fig. 2, and any suitable fastening means may be employed for securing the casing to the headlight.

Within the annular chamber 13 there are pivotally mounted a series of curved plates 14, approximately of the shape shown in Fig. 1. The plates are comparatively thin and are attached to one of the two flanges, for instance, the front flange 12, by a series of pivot pins 15, so that the free end of each plate may swing inwardly toward the center of the casing, each plate swinging substantially in its own plane and all in approximately the same plane. Also mounted in the annular chamber 13, is a ring 16 pivotally connected to each plate by a pivot pin 17. The pins 17 are all located at the same distance from the center but at a different distance from that of the pins 15, so that the ring may be oscillated a limited distance and cause the plates to swing inwardly or outwardly. In Fig. 1, we have shown the ring in one position with the plates swung to the center, and in Fig. 3 the ring has been rotated a slight distance counterclockwise and all of the plates swung out to leave an unobstructed space for the emission of the light rays.

For oscillating the ring, various different mechanisms may be employed, but a simple and very efficient one involves the use of a lever 18 pivotally to the top of the casing and extending transversely thereof. The opposite ends of the lever are provided with depending links 19 pivotally connected to lugs 20 carried by the ring 16 and extending out through slots or openings in the opposite sides of the casing 10. The extent to which the lever may be rocked is determined by the length of the slots and the latter are so positioned that with the lever in one extreme position the plates will be in operative position and when in the opposite position they will be in inoperative position. For rocking the lever, we preferably provide an electromagnet 21 of the solenoid type upon one side of the casing and having a core 22 pivotally connected to one end of the lever. Upon the opposite side of the casing there may be mounted a coil spring 23 acting against a flange 24 connected to the opposite end of the lever. The spring may be mounted within a casing 25 and may normally pull down on the rod 24 and tend to force the plates to closed position. By closing an electric circuit through the magnet by means of any suitable form of switch, push button or other circuit closer 26, the plates may be swung to open position and held there as long as the circuit is closed. It is, of course, evident that this arrangement might be reversed and the spring normally tend to hold the plates open and the electromagnet operate to swing them in open position. Where two separate headlights are employed, as, for instance, on an automobile, the two may be operated from a single source of current and by a single circuit closer.

To permit the partial illumination of the surroundings when the dimmer is in operation, the plates may be so formed as to leave an opening or openings through which a limited amount of light may escape even when the plates are in closed position. This we may accomplish by providing each plate with a narrow slot 27, as illustrated in Fig. 1, or the edges or ends of the plates may be recessed, notched, or partly cut away. In Fig. 4, we have shown somewhat diagrammatically, plates 14$^a$, each of which has its tip end cut away so that when the plates are swung inwardly to the limiting position, there will be a small central aperture for the emission of a limited amount of light.

Various other changes may be made within the scope of the appended claims without departing from the spirit of our invention.

Having thus described our invention, we claim as new and desire to secure by Letters Patent:

1. A headlight dimmer, including an annular casing open at one end, the open end adapted to receive a portion of a headlight and presenting an inwardly directed flange limiting the inward movement of the headlight into said casing, a plurality of plates pivotally secured to a flange upon the opposite end of the casing from said open end and means for swinging said plates toward and from the center of the casing.

2. A headlight dimmer including an annular casing adapted to be attached to a headlight, a plurality of plates pivotally secured to said casing, an oscillating ring pivotally secured to said plates, a lever pivotally mounted upon the casing and operatively connected to said ring, means normally tending to press said lever in one direction, and an electromagnet for moving it in the opposite direction.

3. A headlight dimmer including a casing, a plurality of separate members simultaneously movable to partially close said casing, a ring connected to said members and having oppositely-disposed lugs projecting out through said casing, a lever pivotally connected to said casing upon the exterior thereof, and connections between the opposite ends of said lever and said lugs and means for swinging said lever.

4. A headlight dimmer including a casing, a plurality of separate members simultaneously movable, a ring connected to said members and having oppositely-disposed lugs projecting out through said casing, a lever pivotally connected intermediate of its ends to said casing upon the exterior thereof, separate connections between the opposite ends of said lever and said lugs, and an electromagnet for swinging said lever.

5. In combination, an annular casing, a plurality of pivotally supported plates therein and each having a narrow slot therethrough intermediate of its side edges for the passage of light, and means for swinging said plates toward or from the center of said casing.

In testimony whereof we have signed our names to this specification in the presence of two subscribing witnesses.

G. G. ROSINO.
FRED. W. THOMAS.

Witnesses:
CHAS. A. UTHE,
J. E. HERMAN.